(12) United States Patent
Matheis

(10) Patent No.: US 9,157,481 B2
(45) Date of Patent: Oct. 13, 2015

(54) CLAMPING SYSTEM FOR DETACHABLY CONNECTING TWO PREFERABLY ROTATIONALLY SYMMETRICAL PARTS

(71) Applicant: GUEHRING OHG, Albstadt (DE)

(72) Inventor: Klaus Matheis, Sauldorf/Rast (DE)

(73) Assignee: Guehring OHG, Albstadt (DE)

( * ) Notice: Subject to any disclaimer, the term of this patent is extended or adjusted under 35 U.S.C. 154(b) by 47 days.

(21) Appl. No.: 13/969,960

(22) Filed: Aug. 19, 2013

(65) Prior Publication Data

US 2014/0105681 A1    Apr. 17, 2014

Related U.S. Application Data

(63) Continuation of application No. PCT/EP2012/053742, filed on Mar. 5, 2012.

(51) Int. Cl.
| | | |
|---|---|---|
| *F16B 7/04* | (2006.01) | |
| *F16D 1/04* | (2006.01) | |
| *B23B 31/06* | (2006.01) | |
| *B23B 31/107* | (2006.01) | |
| *B23Q 3/12* | (2006.01) | |

(52) U.S. Cl.
CPC . *F16D 1/04* (2013.01); *B23B 31/06* (2013.01); *B23B 31/1077* (2013.01); *B23Q 3/12* (2013.01); *B23B 2231/24* (2013.01); *B23B 2250/12* (2013.01); *Y10T 403/7062* (2015.01)

(58) Field of Classification Search
CPC .......... Y10T 403/7062; B23B 2231/24; B23B 2250/12
USPC ........... 403/373; 409/135, 136, 232, 234; 82/158, 160; 279/20, 67, 93
See application file for complete search history.

(56) References Cited

U.S. PATENT DOCUMENTS

| | | | | |
|---|---|---|---|---|
| 2,102,576 A | * | 12/1937 | Skaer | 173/60 |
| 3,341,213 A | * | 9/1967 | Lang | 279/103 |
| 5,957,639 A | * | 9/1999 | Freyermuth et al. | 409/232 |
| 6,579,027 B1 | * | 6/2003 | Stolz | 403/297 |
| 6,796,756 B1 | * | 9/2004 | Kleiner | 409/232 |

(Continued)

FOREIGN PATENT DOCUMENTS

| | | |
|---|---|---|
| DE | 10 2006 055422 | 3/2008 |
| DE | 10 2007 024552 | 11/2008 |

(Continued)

*Primary Examiner* — Gregory Binda
*Assistant Examiner* — Nahid Amiri
(74) *Attorney, Agent, or Firm* — Burr & Brown, PLLC

(57) ABSTRACT

A clamping system for detachably connecting two parts, one part has a hollow shaft and the other part has a receiving portion for receiving the hollow shaft with a precise fit, comprising: a main body to be arranged concentrically in the receiving portion, extends into the hollow shaft when the two parts are joined to one another, and bears two clamping bodies, operable in a diametrically opposed manner between release and clamping positions, and comprising an ejector axially adjustable by a defined ejection stroke in a centric through-bore in the main body, the clamping bodies subject the one part to a pressing force in the clamping position, and in the release position subject the one part to an ejection force, the ejector formed from a body of revolution, which is detachably anchored directly in a centric through-bore in the main body with axial play corresponding to the ejection stroke.

18 Claims, 3 Drawing Sheets

(56) References Cited

U.S. PATENT DOCUMENTS 7,244,080 B2 * 7/2007 Voss et al. ................ 408/57
7,731,458 B2 * 6/2010 Matheis ................ 409/234

FOREIGN PATENT DOCUMENTS

DE 10 2010 013156 9/2011
DE 102011005052 A8 * 1/2013

* cited by examiner

CLAMPING SYSTEM FOR DETACHABLY CONNECTING TWO PREFERABLY ROTATIONALLY SYMMETRICAL PARTS

FIELD OF THE INVENTION

The invention relates to a clamping system.

BACKGROUND OF THE INVENTION

Such a clamping system is indicated in DE 102007024552 A1 or DE 102006055422 A1. FIG. 1 shows the clamping system also known as a 4-point clamping system. The clamping system 10 has the function of detachably connecting two preferably rotationally symmetrical parts, of which one part 1 exhibits a preferably cylindrical or conical hollow shaft 2, and the other part 3 exhibits a receiving portion 4 for receiving the hollow shaft 2 with a precise fit. To this end, the clamping system 10 has a main body 11 that is concentrically arranged in the receiving portion of the other part 3, extends into the hollow shaft 2 of the one part 1 when the two parts 1, 3 are joined to each other, and bears two diametrically arranged clamping bodies 12, which can be adjusted in a diametrically opposed manner between a release position and a clamping position (see FIG. 1).

Given an activation in the direction of the clamping position, the two clamping bodies 12 run onto a continuous wedge flank 5 provided in the hollow shaft 2 of the one part 1 and formed by a back-cut clamping shoulder, thereby exposing the hollow shaft of the one part 1 to an axially directed contact force in the direction of the other part 3, and pulling it into the receiving shaft 4 of the other part 3, until a front-end radial annular surface 6 of the inner part 1 hits an opposing front-end radial annular surface 7 of the other part 3. With the two parts 1, 3 joined together, the two clamping bodies 12 not only ensure that enough axial contact force is generated, but also that the hollow shaft 2 of the one part 1 undergoes a certain radial expansion, which offsets the accuracy of fit between the hollow shaft 2 of the one part 1 and the receiving portion 4 of the other part 3, and improves the alignment of the two parts 1, 3. When the two parts 1, 3 are joined together, the hollow shaft 2 of the one part 1 is thus received in the receiving portion 4 of the other part 3 with a tight fit.

Given an activation in the direction of the release position, the two clamping bodies 12 are disengaged from the back-cut shoulder in the hollow shaft 2 of the one part 1. However, the tight fit maintains a tension between the hollow shaft 2 of the one part 1 and the receiving portion 4 of the other part 3, which hampers or even prevents a detachment of the two parts 1, 3.

For this reason, the clamping system indicated in the publications mentioned above has an ejector 13 whose function is to separate the compression bond between the two parts 1, 3 when the two clamping bodies 12 are activated in the direction of the release position. The ejector 13 here consists of two parts. In particular, it is made up of a tubular element 14 and a ring element 15 that envelops the tubular element 14. The tubular element 14 is anchored in the main body 11 by a type of bayonet coupling. The ring element 15 envelops the tubular element 14, and is held in the main body 11 by the tubular element 14 in such a way that it can be axially displaced together with the tubular element 14 for an ejection stroke corresponding to the aforementioned axial play for the ejection process. Given an activation in the release position, the clamping bodies 12 run up onto two wedge flanks 17 provided on the ring element, as a result of which the ring element 15 is exposed to an axially directed ejection force in the direction of one part 1, and presses the one part 1 away from the other part 3. Therefore, the actual ejection function involves the ring element 15, but not the tubular element 14. While the tubular element 14 is taken along by the ring element 15 in the ejection direction, it exerts no ejection force on the one part 1 to be ejected. The two wedge flanks 17 of the ring element 15 are formed on axial extensions 18 of a ring body 16. When the ring body 16 is situated in the centric receiving opening 19, the two axial extensions 18 are positively accommodated in two diametrically opposed, axial driving grooves 20 in the main body 11. The positive accommodation of the two axial extensions 18 in the driving grooves 20 prevents the ring element 15 from twisting in the main body 11, but at the same time ensures the axial displaceability of the ring element 15 required for ejection.

The clamping system 10 indicated in the publications mentioned above has proven itself in terms of function. However, it is still in need of improvement with respect to production. While the centric receiving opening 16 for accommodating the ring body 16 can be fabricated from a production standpoint in an easily initiated drilling process, generating the two eccentric driving grooves 20 for accommodating the two axial extensions 18 requires that the main body 11 be additionally milled. The additional milling of the main body 11 combined with the two-part structure of the ejector 13 comprised of the tubular element 14 and ring element 15 increases the production outlay, and hence the manufacturing costs of the clamping system as a whole. Aside from that, assembly of the ejector 13 and its installation into the main body 11 requires time and technical skill.

Proceeding from the prior art discussed at the outset, i.e., the clamping system illustrated on FIG. 1, the object of the invention is to provide a clamping system, in particular a 4-point clamping system suitable for MQL (minimum quantity lubrication) technology, which is distinguished by a functional structural design that has been simplified in terms of production and assembly.

SUMMARY OF THE INVENTION

This object and further developments can be achieved by the present clamping system.

The clamping system according to the invention has the function of detachably connecting two preferably rotationally symmetrical parts, of which one part exhibits a preferably cylindrical or conical hollow shaft, and the other part exhibits a receiving portion for receiving the hollow shaft with a precise fit. For this purpose, the clamping system according to the invention has a main body to be concentrically arranged in the receiving portion of the other part, which extends into the hollow shaft of the one part when the two parts are joined to each other. The main body bears two clamping bodies that can be activated in a diametrically opposed manner between a release position and a clamping position. In addition, an ejector is held so as to be axially adjustable by a defined ejection stroke in a centric through bore in the main body. In the clamping position, the two clamping bodies subject the one part to a pressing force acting in a pressing direction toward the other part. In the release position, the two clamping bodies conversely subject the one part to an ejection force acting in an ejection direction away from the other part by way of the ejector.

By comparison to the prior art discussed at the outset, the clamping system according to the invention is characterized by the fact that the ejector consists of a rotating body that is detachably anchored directly in a centric through-bore formed in the main body with axial play corresponding to the defined ejection stroke.

As opposed to the ring element of the prior art discussed at the outset, the rotating body is a rotationally symmetrical, oblong body, e.g., a turned part, with a greater axial length in comparison to the ring element. In terms of a MQL-suitable solution, the rotating body is preferably a sleeve body, since it permits a centric coolant/lubricant supply. At least sections of the rotating body have a cylindrical outer periphery, which guides the ejector in an axial direction in the centric through-bore in the main body. The centric through-bore can be fabricated without any special technical difficulty via machining around or along the longitudinal central axis of the main body. For example, machining encompasses a drilling and internal turning process. In a first step, for example, a centric bore can first be created along the longitudinal central axis of the main body, which is subsequently finished in a second step in an internal turning process. Therefore, the term "through-bore" is not based strictly on the result exclusively of drilling. Instead, the term "through-bore" also encompasses results of combined machining processes, in particular the drilling and internal turning steps discussed above. However, at least sections of the through-bore exhibit a cylindrical inner peripheral surface, which guides the ejector comprised of the rotating body in an axial direction.

As opposed to the prior art discussed at the outset, in which the ring element forming the actual ejector is only indirectly held via the tubular element anchored in the main body, the ejector itself is anchored in the centric through-bore in the clamping system according to the invention. The anchoring can be realized through positive locking, for example patterned after the prior art discussed at the outset and resembling a bayonet coupling. In each case, the ejector can be positively joined with the main body in an area having a larger diameter than the tubular element arranged in the ring element according to the prior art discussed at the outset.

By comparison to the prior art discussed at the outset, modifications were only made to the ejector and, as relates to the main body, essentially just to the part that accommodates the ejector and interacts with the ejector, so that the clamping system according to the invention permits the use of all other clamping system components, e.g., the two clamping bodies and a differential threaded spindle that drives the two clamping bodies. Therefore, the clamping system according to the invention requires no major rethinking in comparison to the prior art discussed at the outset in terms of assembly or operation.

In a preferred further development, the ejector exhibits an axial extension in the pressing direction, which is created by cutting, for example milling or grinding, two sections of the web portion that receives the rotating body and is shaped like a circular segment as viewed axially from above. Two diametrically opposed grooves are incorporated into the cylindrical outer peripheral surface of the web portion, and can be engaged with radial projections situated diametrically opposite in the centric through-bore. The two grooves in the web portion can be fabricated in a single operation, for example via outer turning. Since the axial extension is formed on the rotating body, its cylindrical outer peripheral surface lies in the enveloping surface of the rotating body viewed in the axial direction. In comparison to the ring element reflecting the prior art discussed at the outset, the ejector in the clamping system according to the invention thus has no eccentric sections that project over the enveloping surface of the rotating body in the radial direction, for which driving grooves would have to be milled into the main body in additional operations.

The width of the grooves on the web portion of the ejector as measured in the direction of the longitudinal central axis is here preferably designed to be just large enough for the radial projections protruding radially inward from the inner peripheral surface of the centric through-bore to be accommodated in the grooves with an axial play corresponding to a defined ejection stroke. The achievement in this case is that the ejector in the release position is pressed by the two clamping bodies against the two radial projections in the ejection direction. With the two clamping bodies in the release position, the ejector can thus now only be unlatched with a significant exertion of force. This ensures that the ejector cannot inadvertently become unlatched in the release position of the two clamping bodies.

The axial play with which the two radial projections are accommodated in the centric through-bore in the grooves on the axial extension of the ejector is required by the axial displaceability of the ejector, and preferably configured as a narrow clearance fit. Put differently, the ejector is accommodated in the centric through-hole with a precise fit. A continuous sealing ring can further be arranged between the ejector and centric through-hole to provide an additional seal. To this end, the outer peripheral surface of the ejector or inner peripheral surface of the centric through-hole can incorporate a continuous sealing ring groove, which accommodates the sealing ring.

In addition, the ejector can exhibit a continuous wedge flank pointing in the pressing direction, against which the two clamping bodies run up given an activation in the release position direction. The two clamping bodies can exhibit corresponding wedge surfaces. In this further development, the two clamping bodies become part of a wedge gear together with the continuous wedge flank when moved radially inward.

In a preferred further development, the two clamping bodies are positively accommodated in two diametrically opposing recesses in the main body, which extend radially inward to such an extent as to expose the centric through-bore over the entire axial length of the two recesses.

The ejector can further have a continuous flange on its end lying in the ejection direction. The flange is preferably designed in such a way as to be completely inserted into a front-end receiving opening formed in the main body when the two clamping bodies are activated in the direction of the clamping position, and retracted from the front-end receiving opening by the defined ejection stroke when the two clamping bodies are activated in the direction of the release position.

In a further development suitable for MQL technology, the ejector is combined with a coolant/lubricant feeder tube centrically arranged in the main body. The coolant/lubricant feeder tube can be designed as a single piece with the ejector, for example as a turned part, or connected to form a manageable single piece. In the latter case, the coolant/lubricant feeder tube is separate from the ejector, which is here designed as a sleeve body, and preferably inserted in the sleeve body with a tight fit. This further development ensures that the ejector takes along the tubular element during a rotational and axial movement, i.e., during assembly and given an ejection motion, which simplifies assembly, and prevents an interruption in coolant/lubricant supply from the very outset with the clamping system in use.

The end of the ejector lying in the pressing direction preferably exhibits a centric tool holding recess, for example a hexagon socket recess, which permits the insertion of a corresponding assembly tool, e.g., Allen wrench.

BRIEF DESCRIPTION OF THE DRAWINGS

A preferred embodiment of the clamping system according to the invention will be described in greater detail below based on schematic drawings.

DETAILED DESCRIPTION OF THE PRESENT INVENTION

Figure 2:
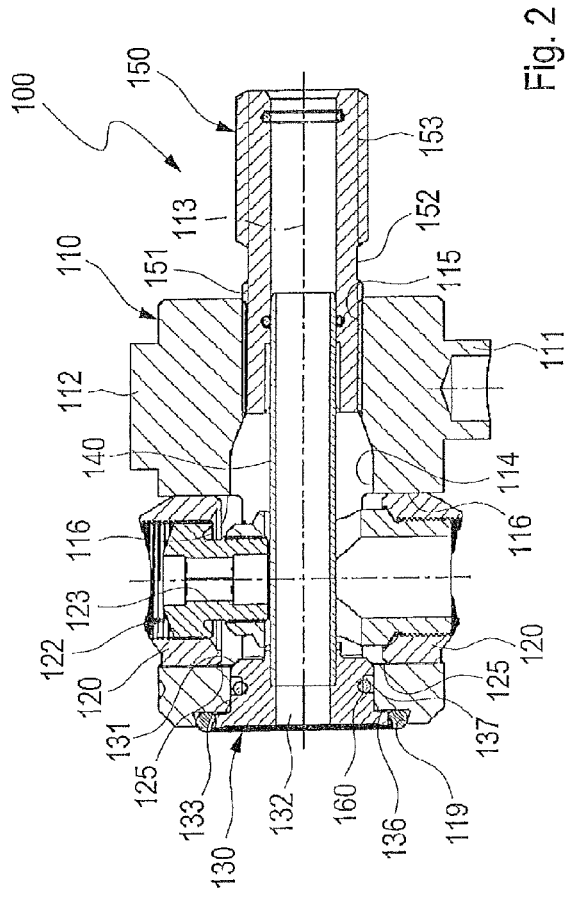
FIG. 2 shows a longitudinal section of a clamping system according to the invention.
Figure 7:
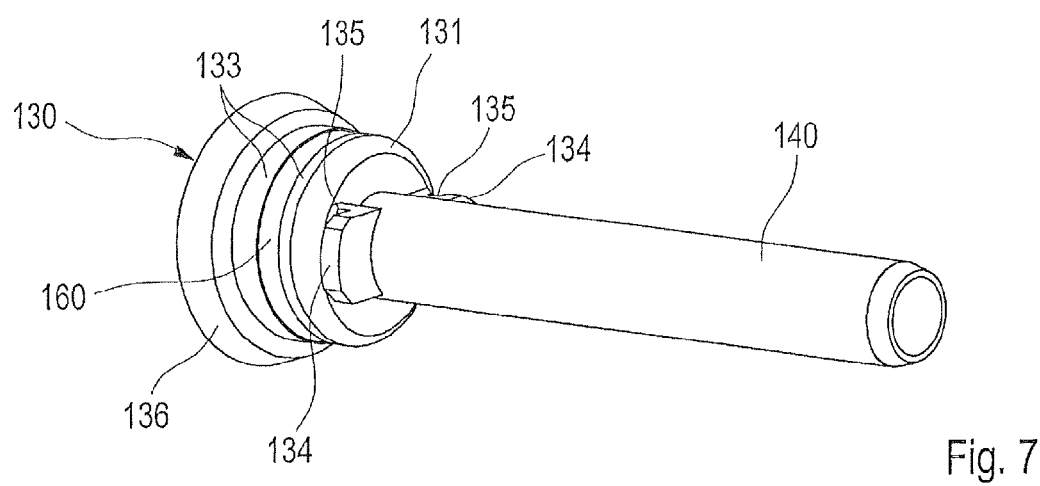

FIGS. 2 and 7 will be used below to describe a preferred embodiment of a clamping system according to the invention.

Figure 1:
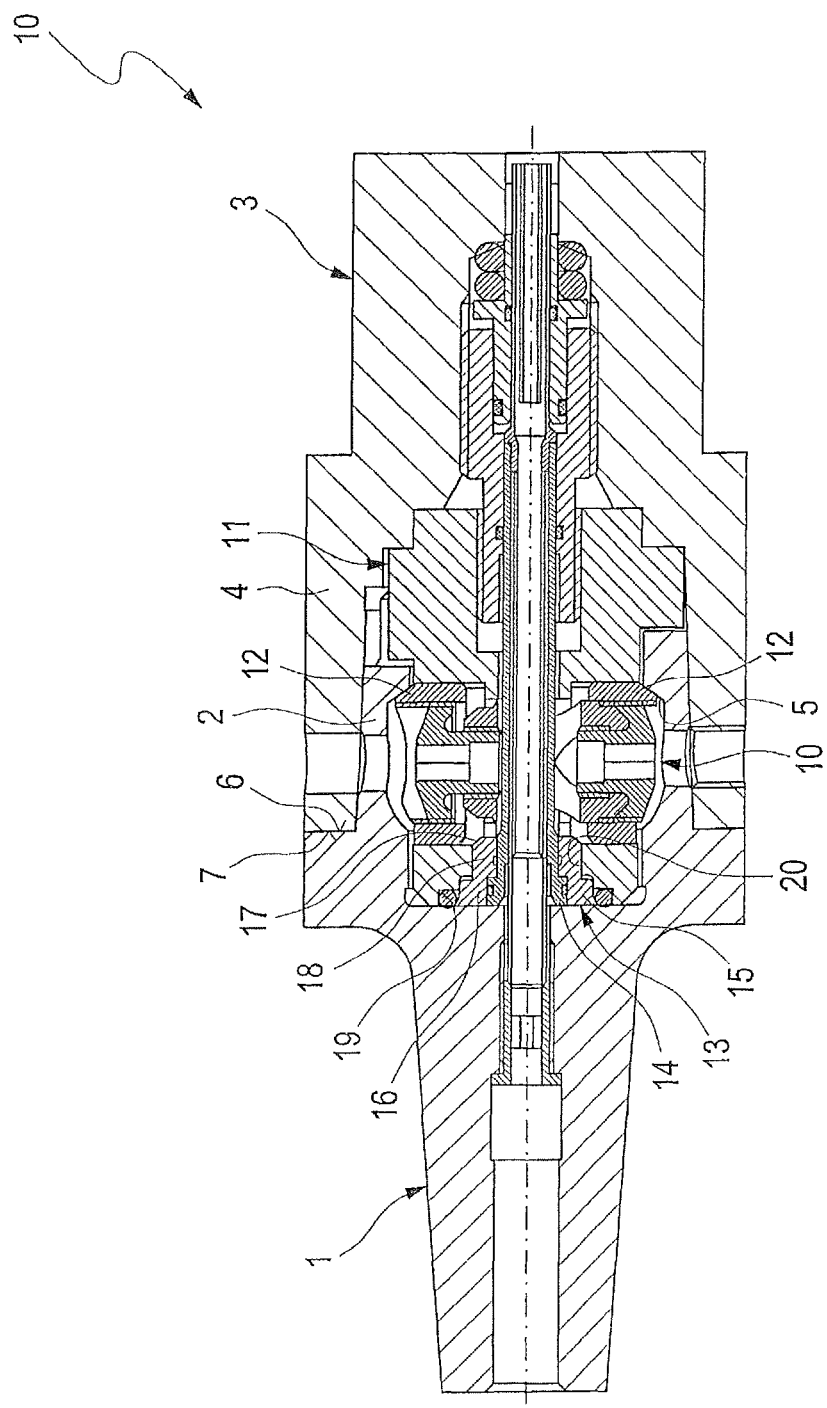
FIG. 1 shows a longitudinal section of a connection between two parts known from DE 102007024552 A1 or DE 102006055422 A1 established with the help of a generic clamping system.
Figure 4:
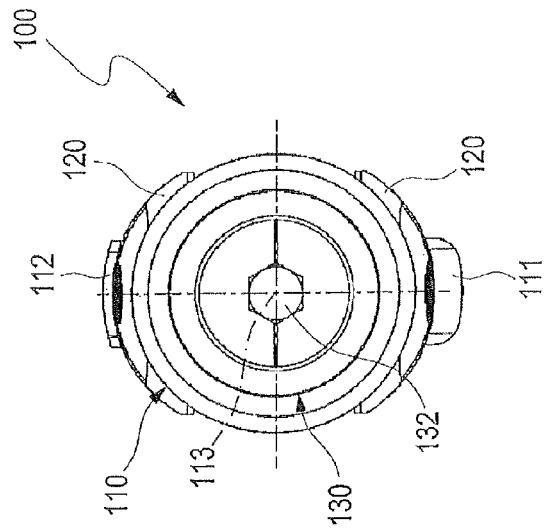
FIG. 4 shows a front view of the clamping system according to the invention from FIG. 2.

In the preferred embodiment, the clamping system according to the invention is designed as a 4-point clamping set. Similarly to the system depicted on FIG. 1, it has the function of axially clamping together two preferably rotationally symmetrical parts. The structure of the two parts to be joined along with the interaction between the clamping system and the two parts to be joined may be gleaned from FIG. 1, and thus requires no further explanation.

The clamping system 100 according to the invention shown on FIGS. 2 to 6 has a main body 110 bearing two clamping bodies 120, which can be displaced in a diametrically opposed manner between a release position (not depicted) and the clamping position shown on FIG. 2 by means of a driver configured as a differential threaded spindle 122 in the preferred embodiment. In addition to the two clamping bodies 120 and differential threaded spindle 122, an ejector 130 combined with a tubular element 140 is situated in the main body 110.

The main body 110 consists of a rotating body. Its outer periphery bears two driving bodies 111, 112 moulded on to form a single piece, which are arranged diametrically opposite each other. The driving bodies 111, 112 serve to positively anchor the main body 110 in the part 3 shown on FIG. 1. A centric through-bore 114 running along a longitudinal central axis is formed in the main body 110. The centric through-bore 114 can be generated in a drilling and turning process. A centric bore will initially be fabricated in a first step, which will then be further machined via internal turning in a second step so as to yield two diametrically opposed radial projections 118, which serve to anchor the ejector 130, as will be explained further on. The centric through-bore 114 passes over into a threaded bore 115 on the side facing the driving bodies 111, 112. The threaded bore 115 is adjusted to a first threaded section 151 of a connecting piece designed as a differential threaded bolt 150, which is separated by a groove 152 from the first threaded section 151 and bears as second threaded section 153, whose thread is concordant with the thread of the first threaded section 151, but has a higher pitch. The second threaded section 153 can be screwed into a corresponding threaded bore on the side of the part 3, so as to join the clamping system 100 with part 3. The ejector 130 is situated in the end section of the centric through-bore 114 averted from the two driving bodies 111, 112, as depicted on FIG. 2, 3. The ejector 130 will be described extensively further below.

In a middle section viewed in the axial direction, the main body 110 is provided with two diametrically opposed recesses 116 for positively accommodating the two clamping bodies 120. The arrangement is such that the two clamping bodies 120 are guided with a precise fit over their front ends by the lateral surfaces of the recesses 116, and held in the main body 110 so that they can be moved in a diametrically opposite manner. In particular, the clamping bodies 120 are formed by bodies with a lens-shaped cross section. The recesses 116 in the main body 110 run so deep in a radial direction that the clamping bodies 120 can be completely retracted into the recesses 116. To this end, the curvature of the outer surface of the two clamping bodies 120 essentially corresponds to the curvature of the cylindrical outer surface of the main body 110. The inner surfaces of the two clamping bodies 120 are designed analogously to the surface areas of the two recesses 116 as plane surfaces. Furthermore, the recesses 116 are made to run so deep in a radial direction as to expose the centric through-bore 114 to such an extent that the clamping bodies 120 situated in the recesses 116 engage into the centric through-hole 114 in the release position (not shown), and displace the ejector 130 on FIGS. 2 and 3 to the left, i.e., in the ejection direction.

The clamping bodies 120 are each provided with radial threaded bores 122, into which are screwed the differential threaded spindle 122. The differential threaded spindle 122 has a structure and function known from the prior art discussed at the outset, and is arranged in a transverse bore 117 formed in the main body 110, which as readily visible on FIG. 4 intersects the centric through-bore 114. A hexagon socket recess 123 can be used to drive the differential threaded spindle 122 by means of a wrench radially insertable from outside in a way that the differential threaded spindle 122 moves the two clamping bodies 120 oppositely either diametrically outward into the clamping position shown on FIG. 2 or diametrically inward into the release position, depending on the rotational direction of the wrench.

Figure 3:
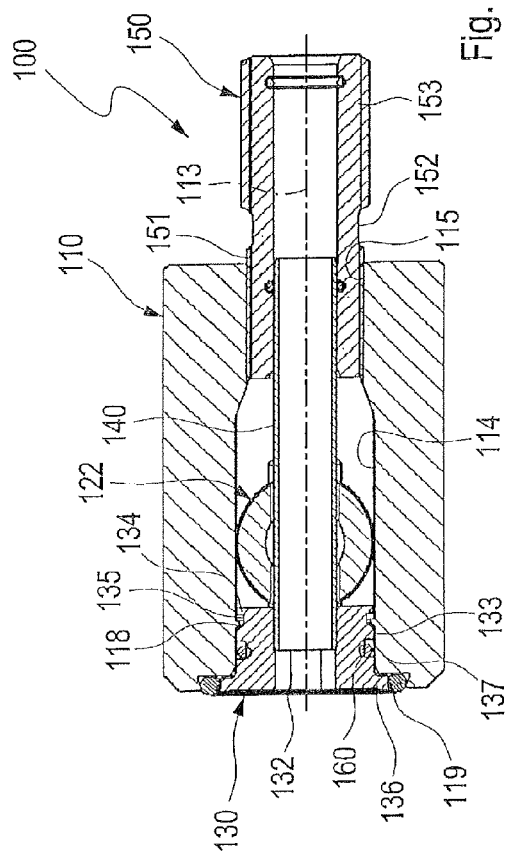
FIG. 3 shows a longitudinal section of the clamping system from FIG. 2 in a position rotated by 90° around the longitudinal central axis.
Figure 5:
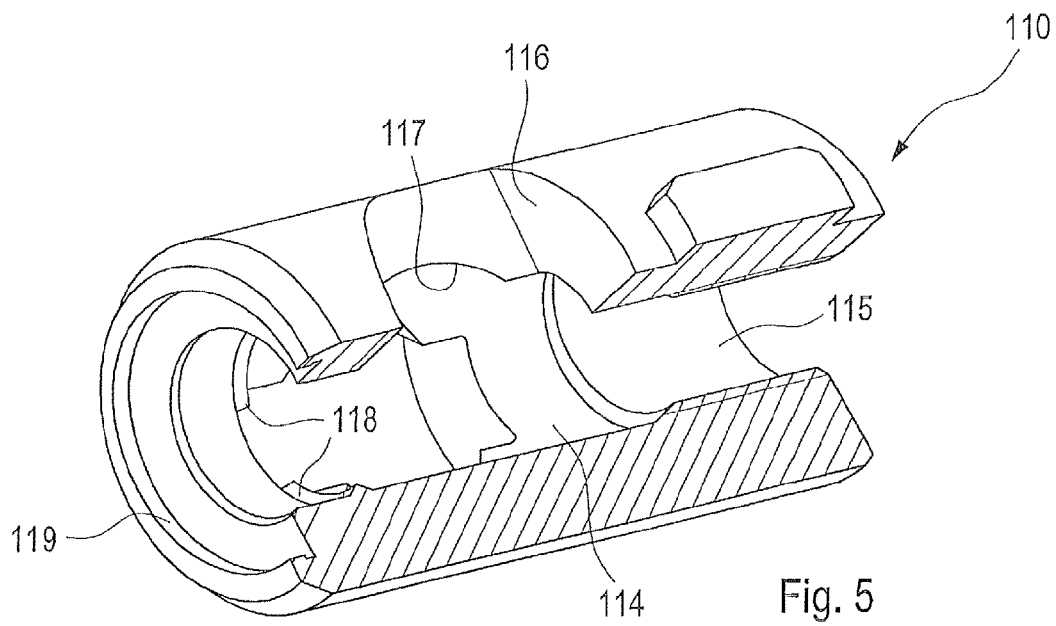
FIG. 5 presents a perspective view showing a longitudinal section of a main body of the clamping system according to the invention.

As may be gleaned from FIGS. 2, 3 and 5, the two recesses 116 reach a radially inward extension or depth at which the centric through-bore 113 becomes radially accessible via the two recesses 120 over their entire axial length. For this reason, the surface areas of the two recesses 120 are each formed by two partial surfaces situated laterally in relation to the longitudinal central axis 113, of which one is readily visible on FIG. 4. When the two clamping bodies 120 are activated in the direction of the release position, the two clamping bodies thus penetrate into the centric through-bore 114, and run up on the ejector 130 arranged in the centric through-bore 114.

To this end, the two end faces of the clamping bodies 120 facing the ejector 130 each exhibit a wedge surface 125, which abuts against a continuous wedge flank 131 provided on the ejector 130 when the two clamping bodies 120 are activated in the direction of the release position. When moved radially inward, the two clamping bodies 120 therefore become part of a wedge gear mechanism together with the continuous edge flank 131 on the ejector 130.

The ejector 130 consists of a cylindrical sleeve body arranged in the centric through-bore 114 with a precise fit. The aforementioned continuous wedge flank 131 is provided on the end face of the ejector 130 facing the two clamping bodies 120, as may be gleaned from FIGS. 2, 3 and 7. The sleeve body is a rotationally symmetric, oblong hollow body, for example a turned part, with a at least sectionally rotationally symmetric, preferably cylindrical outer peripheral surface 133, which ensures that the ejector 130 can be guided without tilting in the centric through-bore 130.

The ejector 130 is positively anchored in the centric through-bore 114 in the main body 110, but with an axial play that reflects the desired ejection stroke. In particular, the anchoring is achieved with a type of bayonet coupling. To this end, the end face of the ejector according to FIGS. 6 and 7 lying in the pressing direction exhibits an axial extension 133, which consists of a web portion 134 obtained by cutting two sections shaped like a circular segment as viewed axially from above. Two diametrically opposed grooves 135 are incorporated on the cylindrical outer peripheral surface of the web portion 134, and can be engaged with radial projections 118 (see FIGS. 3 and 4) provided in the centric through-bore. As shown on FIG. 3, the axial extension 133 is incorporated into the sleeve body. Therefore, the cylindrical enveloping surface of the axial extension 133 is aligned with the cylindrical enveloping surface of the portion with the cylindrical outer peripheral surface 133 of the ejector 130.

The width of the grooves 135 as measured in the direction of the longitudinal central axis 113 of the main body 110 is here designed to be just large enough for the radial projections protruding from the inner peripheral surface of the centric through-hole 113 to be accommodated in the grooves 135 with an axial play corresponding precisely to the desired ejection stroke. This keeps the ejector 130 pressed against the radial projections 118 with the two clamping bodies 122 in the release position in the ejection direction.

Furthermore, the end of the ejector 130 lying in the ejection direction is expanded radially outward like a flange. The flange 136 is designed in such a way as to be completely inserted into a front-end receiving opening 119 formed in the main body 110 when the two clamping bodies 120 are activated in the direction of the clamping position, and retracted from the front-end receiving opening 119 by the defined ejection stroke when the two clamping bodies 120 are activated in the direction of the release position.

The end of the ejector 130 lying in the pressing direction further exhibits a centric hexagon socket recess 132, which permits the insertion of a corresponding assembly tool, e.g., Allen wrench, to anchor the sleeve body 132 in the main body 110.

Figure 6:
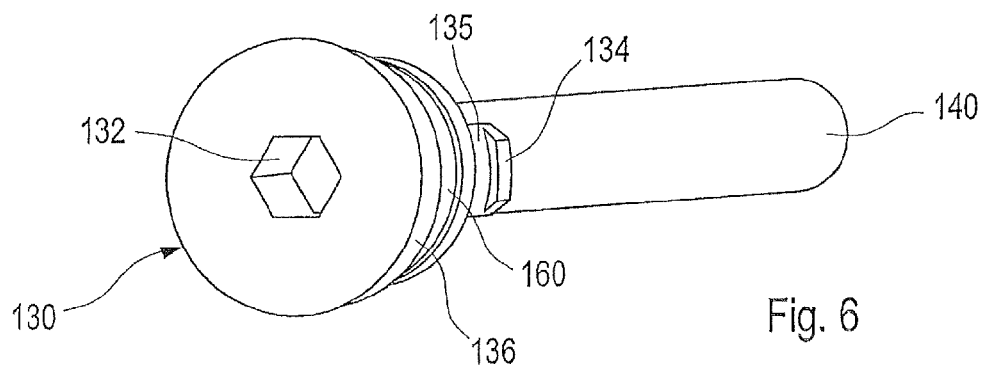
FIGS. 6 and 7 present a perspective view showing two side views of an ejector coolant/lubricant feeder tube unit of the clamping system according to the invention.

As shown on FIGS. 5 and 6, the ejector 130 is combined with a coolant/lubricant feeder tube 140 that concentrically penetrates the centric through-bore 114. In the embodiment depicted, the coolant/lubricant feeder tube 140 is designed as a single piece with the ejector 130. However, it can alternatively also be situated in the centric bore of the ejector 130 comprised of the sleeve body with a tight fit, so that it is taken along by the ejector 130 in an axial direction and rotational direction around the longitudinal central axis 113. On the side averted from the ejector 130, the coolant/lubricant feeder tuber 140 is accommodated in a centric bore of the differential threaded bolt 150 mentioned above with a precise fit.

The cylindrical outer peripheral surface 133 of the ejector 130 further exhibits a continuous annular groove 137, which incorporates a sealing ring 160.

FIGS. 2 and 3 show the clamping system in a pre-assembled state of the kind that can be achieved as follows: The differential threaded spindle 122, upon which one of the two clamping bodies 120 had previously already been placed, is first inserted in the transverse bore 117. The other of the two clamping bodies 120 can then be placed on the differential threaded spindle 122 on the opposing side, and screwed thereto by turning the differential threaded spindle 122. Continued turning makes it possible to synchronously screw the differential threaded spindle 122 into both clamping bodies 122 until such time as the two clamping bodies 122 are reliably held on the main body 110. In this state, the differential threaded bolt 150 can then be screwed into the main body 110. The ejector 130 combined with the tubular element 140 can then be inserted into the centric through-hole 114 and moved into a rotational position in which the axial extension 133 can pass between the two radial projections 118. In the process, the tubular element 140 dips into the differential threaded bolt 150 screwed into the main body 110, and the flange 136 dips into the front-end receiving opening 119 formed in the main body 110. In the position shown on FIGS. 2 and 3, where the flange 136 abuts against the surface area of the receiving opening 119, the ejector 130 with the tubular element 140 can be turned by about 90°, so as to engage the radial projections 118 with the two grooves 135 in the axial extension 133. In this state, the two clamping bodies 120 can be moved into the release position by further screwing in the differential threaded spindle 122, so that the clamping system is ready for assembly in the receiving portion 4 of the part 2 depicted on FIG. 1.

The invention claimed is:

1. A clamping system for detachably connecting two parts, of which one part exhibits a hollow shaft, and the other part exhibits a receiving portion for receiving the hollow shaft with a precise fit, the clamping system comprising:
   a main body configured to be concentrically arranged in the receiving portion of the other part, the main body configured to extend into the hollow shaft of the one part when the two parts are joined together, the main body bearing two clamping bodies, the two clamping bodies adjustable in a diametrically opposed manner between a release position and a clamping position; and
   an ejector held so as to be axially adjustable by a defined ejection stroke in a centric through-bore in the main body,
   the two clamping bodies configured to run up against a surface of the ejector when the clamping bodies are in the release position,
   the two clamping bodies configured to subject the one part to a pressing force acting in a pressing direction toward the other part when the two clamping bodies are in the clamping position and when the main body is concentrically arranged in the receiving portion of the other part,
   the two clamping bodies configured to subject the one part to an ejection force acting in an ejection direction away from the other part by way of the ejector when the two clamping bodies are in the release position and when the main body is concentrically arranged in the receiving portion of the other part, and
   the ejector comprising a rotating body, the rotating body detachably anchored directly in a centric through-bore formed in the main body with axial play corresponding to the defined ejection stroke.

2. A clamping system as recited in claim 1, wherein the ejector comprises a sleeve body.

3. A clamping system as recited in claim 1, wherein the ejector is anchored in the main body as a bayonet coupling.

4. A clamping system as recited in claim 3, wherein
   the ejector exhibits an axial extension in the pressing direction, the axial extension created by cutting two sections of a web portion that receives the rotating body and is shaped like a circular segment as viewed axially from above, and the web portion exhibits two diametrically opposed grooves, the grooves engageable with radial projections situated diametrically opposite in the centric bore-hole.

5. A clamping system as recited in claim 4, wherein the grooves of the web portion in the axial direction are configured to be just large enough for the radial projections in the centric through-bore to be accommodated in the grooves with an axial play corresponding to the defined ejection stroke.

6. A clamping system as recited in claim 1, wherein the ejector exhibits a continuous wedge flank pointing in the pressing direction, the two clamping bodies running up against the continuous wedge flank given an activation in the release position direction.

7. A clamping system as recited in claim 6, wherein
the two clamping bodies are positively accommodated in two diametrically opposing recesses in the main body, and
the two recesses extend radially inward to such an extent as to expose the eccentric through-bore.

8. A clamping system as recited in claim 1, wherein the ejector exhibits a continuous flange on an end of the ejector lying in the ejection direction.

9. A clamping system as recited in claim 8, wherein the flange is configured to be inserted into a front-end receiving opening formed in the main body when the two clamping bodies are activated in the direction of the clamping position, and retracted from the front-end receiving opening by the defined ejection stroke when the two clamping bodies are activated in the direction of the release position.

10. A clamping system as recited in claim 1, wherein a coolant/lubricant feeder tube is combined with the ejector.

11. A clamping system as recited in claim 10, wherein the coolant/lubricant feeder tube is a single piece with the ejector.

12. A clamping system as recited in claim 10, wherein the coolant/lubricant feeder tube is connected to form a manageable single piece with the ejector.

13. A clamping system as recited in claim 1, wherein a face of the ejector pointing in the pressing direction exhibits a tool holding recess for accommodating a corresponding tool.

14. A clamping system as recited in claim 1, wherein the clamping system is for detachably connecting two rotationally symmetrical parts.

15. A clamping system as recited in claim 1, wherein the hollow shaft is cylindrical or conical.

16. A clamping system as recited in claim 1, wherein the rotating body is rotatable relative to the main body.

17. A clamping system as recited in claim 1, wherein the rotating body is rotationally symmetrical.

18. A clamping system as recited in claim 1, wherein the rotating body has a cylindrical enveloping surface.

* * * * *